H. Disston.
Circular-Saw.
Nº 73238      Patented Jan. 14, 1868.
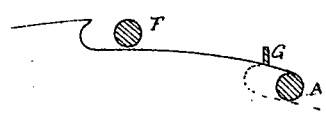
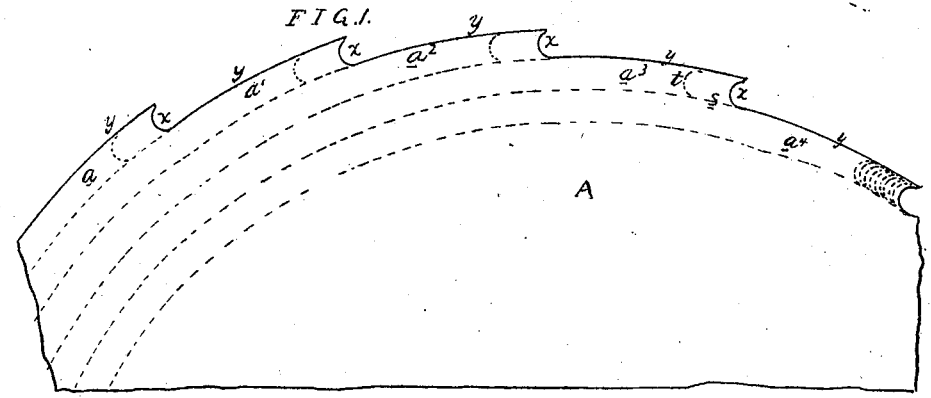
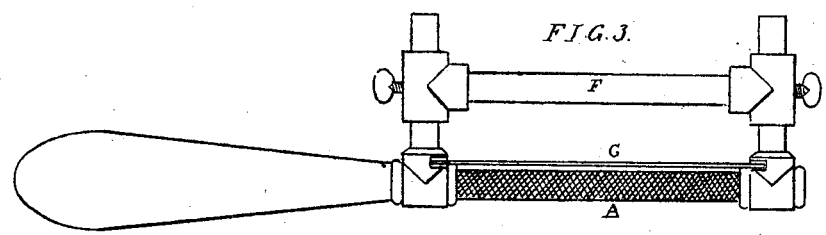
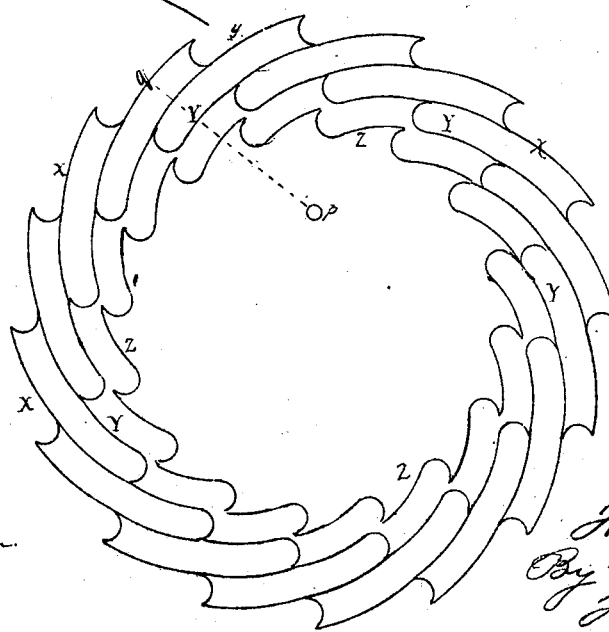
Witnesses:
Inventor:

United States Patent Office.

HENRY DISSTON, OF PHILADELPHIA, PENNSYLVANIA.

Letters Patent No. 73,238, dated January 14, 1868.

IMPROVEMENT IN CIRCULAR SAWS.

*The Schedule referred to in these Letters Patent and making part of the same.*

TO ALL WHOM IT MAY CONCERN:

Be it known that I, HENRY DISSTON, of Philadelphia, Pennsylvania, have invented an Improvement in Circular Saws; and I do hereby declare the following to be a full, clear, and exact description of the same.

My invention consists of a circular saw, the teeth of which are shaped for being sharpened, in the manner described hereafter, so that the said teeth may be cut away to any extent which proper sharpening may require, without removing the saw from its spindle, or without reducing it in diameter to the extent necessary in sharpening the teeth of ordinary saws.

In order to enable others skilled in the art to make my invention, I will now proceed to describe the construction of the same, reference being had to the accompanying drawing, which forms a part of this specification, and in which—

Figure 1 represents sufficient of a circular saw to illustrate my improvement.

Figure 2, a diagram illustrating my invention.

Figure 3, a plan view of an instrument which may be used for sharpening the teeth; and Figures 4, 5, and 6, further diagrams illustrative of my invention.

A, fig. 1, represents part of a circular saw, and $a$ $a^1$ $a^2$ $a^3$ $a^4$ are five of the teeth, the edge $y$ of each of which must be in the arc of a circle, while the front edge $x$ may be curved, and bevelled to a sharp cutting-edge at the point. When the points of the teeth have been worn away, they are sharpened by filing or otherwise cutting away the front edge $x$ of each tooth, until a new point is formed, a cutting-tool of such a character being employed that the precise shape of the front edge is preserved, while the tool is so guided that the relative positions of the two edges $x$ and $y$ are never altered, whatever may be the extent to which the tooth is cut away. For instance, supposing that the tooth $a^3$, in order to be sharpened, has to be cut away from $x$ to $t$, fig. 1, an instrument similar to that shown in fig. 3 may be used, the cylindrical file A corresponding to the shape of the front edge of the tooth, and the bar F coming in contact with the front edge of the tooth $a^2$, when the tooth $a^3$ has been filed away to the line $t$, while the strip G, resting on the top of the tooth, guides the file, so that it cannot cut deeper than the line $s$. This instrument is more fully described in a separate application for a patent, filed by me May 30, 1867. Inasmuch as this line $s$ (which, as the front of the tooth is removed, forms a continuation of the back of the tooth $a^4$,) is determined by the back of the tooth $a^3$, as a guide for the instrument, this line must be in the arc of a circle, having the same centre as that from which the back of the tooth $a^3$ is drawn, and thus, as the saw is sharpened, the extent to which one tooth is cut away is determined by the tooth previously cut, while the form of the continuation of the back of the tooth to be next cut in front is determined by the back of the tooth, the front of which is being cut away.

Owing to these peculiarities in the form of the teeth, the relative positions of the front and back edges can never be altered by sharpening them as above described, although the teeth must of necessity become shorter as the saw is reduced in diameter. This will be readily seen on reference to the diagram, fig. 2, where the lines X indicate the outlines of the original teeth, the lines Y the outlines when each tooth has been cut away to the extent indicated, and the lines Z the outline of the saw when the teeth have been still further cut away.

The advantages of my improvement will be best observed by comparing the teeth in fig. 1 with the ordinary saw-teeth, which are made of different shapes, but have never been made of such a form that, in sharpening one tooth, its back will serve as a guide to determine the shape of the continuation of the back of the teeth which is about to be sharpened. In fig. 5, for instance, are represented teeth of a common form, to sharpen which involves the necessity of the removal of a considerable amount of metal, and a great decrease in the diameter of the saw, whereas, in sharpening the teeth in fig. 1, all that is necessary is to remove a small portion of the front of one tooth by the guided file, or other equivalent instrument, this sharpening being effected with the removal of a very small amount of metal, compared with that removed in sharpening ordinary teeth; hence my improved saw will not only last much longer, but will require less labor and time to maintain in a sharpened condition, with a less reduction in diameter than saws with ordinary teeth.

The sharpening of my improved saw can also be effected without removing it from its bearings, whereas ordinary saws have frequently to be removed, and sent a great distance, to a manufacturer, in order to be sharpened by cutting or punching pieces from the plate.

It will be seen that these important ends can only be accomplished by a proper regard to the shape and equality of the teeth first cut, for upon these teeth depends the accuracy of the subsequent sharpening of the teeth, and the maintaining of the saw in a true circle, concentric with its spindle, and having teeth of equal size. The first teeth can be easily determined in the following manner: Let $m$, fig. 6, represent a portion of the circumference of the steel plate from which the saw has to be made, and $n$ a line concentric with the circumference, and determining the depth to which the teeth must be cut. The circumference is divided into the desired number of teeth, the radial lines $u$ representing the fronts of the cutting-points, from which curves $e$ may be formed to represent the fronts of the teeth, these curves being limited by the line $n$. The backs of the teeth can now be determined by describing the arc of a circle from the point where the curve $e$, representing the front of one tooth, touches the line $n$, to the point $w$ of the next tooth. The back of each tooth must in all cases be in the arc of a circle, (no other curve will answer the purpose,) drawn from a point eccentric with the centre of rotation of the saw. Thus, in fig. 2, the back edge of the tooth $q$ is in the arc of a circle, drawn from the point $p$, and every tooth in the saw is formed in a similar manner, so that the sharpening of the teeth may be effected by a reduction of the front edges in spiral courses. It will be understood that it is not absolutely necessary that the front of the tooth should be curved.

I claim as my invention, and desire to secure by Letters Patent—

A circular saw, every tooth of which has its back edge so formed in the arc of a circle, having a centre eccentric with the centre of rotation of the saw, that the sharpening of each tooth may be effected by reducing the front edge in a spiral course, as herein set forth.

In testimony whereof, I have signed my name to this specification in the presence of two subscribing witnesses.

HENRY DISSTON.

Witnesses:
   C. E. FOSTER,
   W. J. R. DELANY.